United States Patent [19]

Akasaki et al.

[11] Patent Number: 4,750,068
[45] Date of Patent: Jun. 7, 1988

[54] MECHANISM FOR MOVING A MAGNETIC HEAD

[75] Inventors: Tetsuro Akasaki; Tomiyoshi Sato; Hidenobu Takahashi; Masahiro Kimura, all of Hitachi; Seiichi Hayashi, Mito, all of Japan

[73] Assignee: Hitachi, Ltd., Tokyo, Japan

[21] Appl. No.: 823,749

[22] Filed: Jan. 29, 1986

[30] Foreign Application Priority Data

Jan. 31, 1985 [JP] Japan .................... 60-16882
Apr. 9, 1985 [JP] Japan .................... 60-74672

[51] Int. Cl.⁴ ............................................. G11B 5/55
[52] U.S. Cl. .................................... 360/106; 74/89.15
[58] Field of Search ............... 360/104, 105, 106, 109; 74/424.8 A, 424.8 R, 89.15

[56] References Cited

U.S. PATENT DOCUMENTS

| | | | |
|---|---|---|---|
| 2,293,218 | 8/1942 | Rieber | 74/424.8 A |
| 3,546,930 | 12/1970 | Flarsheim | 74/89.15 |
| 3,733,914 | 5/1973 | Sheesley | 74/89.15 |
| 3,895,543 | 7/1975 | Metzger et al. | 74/89.15 |
| 4,125,049 | 11/1978 | Price, Jr. | 74/428.8 A X |
| 4,333,116 | 1/1982 | Schoettle et al. | 360/105 X |
| 4,376,961 | 3/1983 | Torii et al. | 360/106 |
| 4,528,607 | 7/1985 | Thompson | 74/424.8 R X |

FOREIGN PATENT DOCUMENTS 0837353  6/1960  United Kingdom ............... 360/109

Primary Examiner—Robert S. Tupper
Assistant Examiner—Andrew L. Sniezek
Attorney, Agent, or Firm—Antonelli, Terry & Wands

[57] ABSTRACT

A mechanism for moving a magnetic head of a type at least having a chassis, a motor mounted on the chassis, a lead screw driven by the motor either in a normal rotational direction or in a reverse rotational direction, guide shafts mounted on the chassis, and a carriage carrying a magnetic head thereon and slidably mounted on the guide shafts. A connecting cam body is provided to convert the rotational movements of the lead screw into a reciprocating movement of the carriage, and the carriage is forced to one direction by the connecting cam body.

7 Claims, 6 Drawing Sheets

MECHANISM FOR MOVING A MAGNETIC HEAD

BACKGROUND OF THE INVENTION

The present invention relates to a mechanism for moving a magnetic head used for the magnetic recording and reproducing apparatus.

In, for example, Japanese Utility Model Laid Open Publication No. 82-38378, a mechanism for moving a magnetic head of a conventional lead screw type is provided which employs a general construction in which a linear and needle shaped member are moved, with the member being pressed against the lead screw. A disadvantage of this mechanism resides in the fact that, when the position of the lead screw relative to the needle shape member is changed due to possible manufacturing errors, etc, the positional accuracy of the mechanism is adversely affected due to the undesirable change of the position in which the lead screw contacts with the needle shape member. Additionally, the above proposed mechanism suffers from another disadvantage, namely, if the rotational direction of the lead screw is reversed, the force acting laterally to the carriage is also reversed correspondingly thereby causing an undesirable swinging movement of the carriage because of the clearance formed between the carriage and the guide shafts.

SUMMARY OF THE INVENTION

An object of the present invention is to eliminate the above-mentioned disadvantages and to provide a mechanism for moving a magnetic head which can realize a high precision positioning of the magnetic head according to a simplified construction of the mechanism.

The characteristic feature of the present invention resides in the fact that the above-mentioned object is attained by a mechanism for moving a magnetic head of a type at least having a chassis, a motor mounted on the chassis, a lead screw driven by the motor either in a normal rotational direction or in a reverse one, guide shafts mounted on the chassis, and a carriage carrying a magnetic head thereon and slidably mounted on the guide shafts, wherein a connecting cam body is provided to convert the rotational movements of the lead screw into a reciprocating movement of the carriage, and wherein the carriage is forced to one direction by the connecting cam body.

DETAILED DESCRIPTION OF THE PREFERRED EMBODIMENTS

Figure 1:
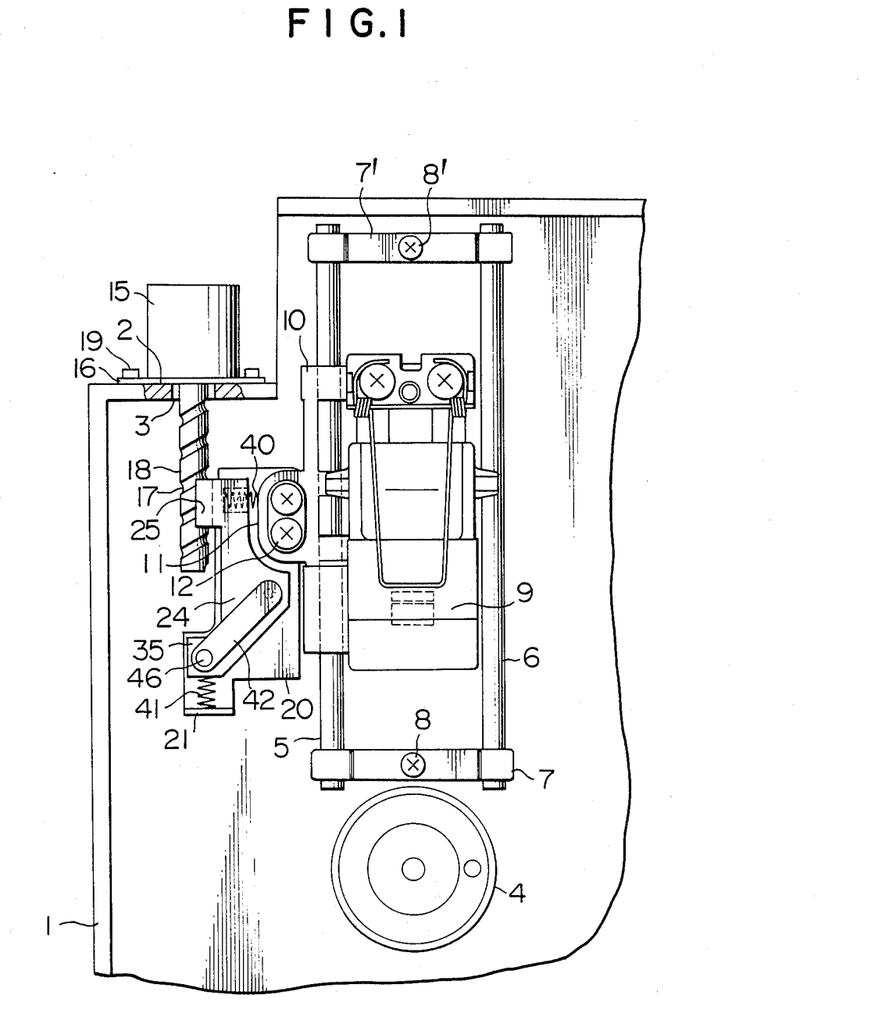
FIG. 1 is a plan view showing the construction of the feed mechanism according to the invention used for a magnetic recording apparatus.

Referring now to the drawings wherein like reference numerals are used throughout the various views to designate like parts and, more particularly, to FIG. 1, according to this figure, a chassis 1 is provided with a driving hub 4 which is directly connected to a motor for driving a flexible disc, with the chassis 1 also being provided, through pairs of guide shaft pads 7, 7' and screws 8, 8', with a pair of guide shafts 5, 6 for a carriage 10 which carries a magnetic head 9 so as to move the magnetic head 9 against the hub 4. A chassis mounting surface 2 for a stepping motor 15 is provided on one side of the chassis 1, with the stepping motor 15 including a lead screw 18 having a lead 17 extending through a mounting bore 3 for the motor, and being secured at a mounting flange portion 16 onto the chassis mounting surface 2 by fasteners such as, for example, screws 19.

The lead screw 18 is located in a moving direction of the carriage 10, that is substantially in parallel with the guide shafts 5, 6. A connecting seat portion 11 is provided on the side of the carriage 10 facing the lead screw 18, and connected to a cam plate 20 by fasteners such as, for example, screws 12. A connecting cam body 24 is provided on the cam plate 20, with the cam body 24, on one side thereof, including a cam portion 25 engaging with the lead screw 18 and being retained, on the other side thereof, in a position by a supporting pin 46.

Figure 4:
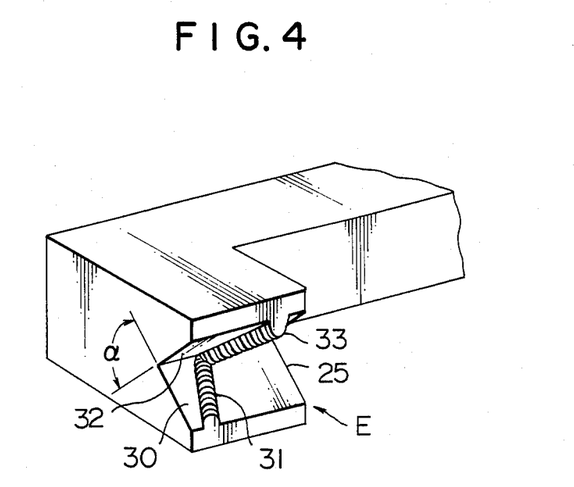
FIG. 4 is an enlarged perspective view of the cam portion.
Figure 5:
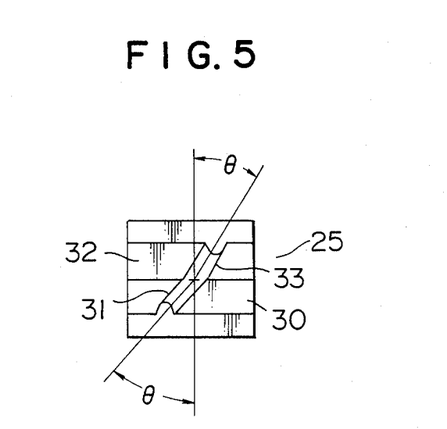
FIG. 5 is a view taken in the direction of the arrow E in FIG. 4.

As shown in FIGS. 4 and 5, the connecting cam body 24 forms at an end thereof a pair of inclined beveled edge faces 30, 32 having an angle of inclination $\alpha$, with each of the inclined edge faces 30, 32 being formed with cam teeth 31, 32, respectively. The cam teeth 31, 32 have the same lead angle $\theta$ (FIG. 5) as that of the lead 17 of the lead screw 18 thereby enabling the lead 17 to engage with respective cam teeth 31, 33.

Figure 2:
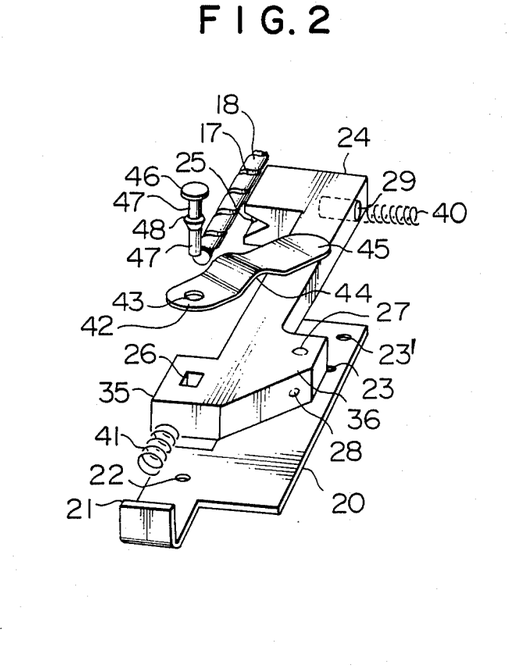
FIG. 2 is a perspective view showing the construction of the cam body portion.
Figure 3:
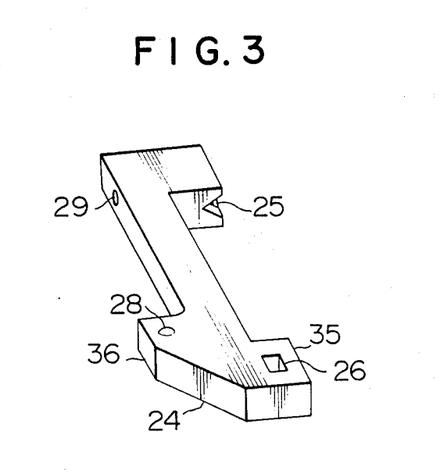
FIG. 3 is a perspective rear view of the cam body.
Figure 6:
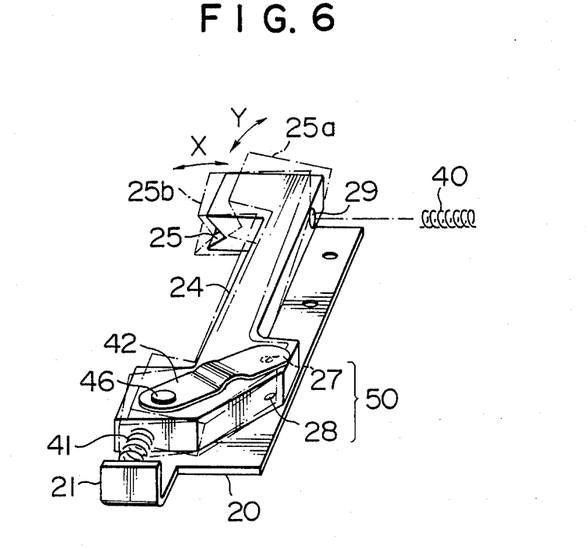
FIG. 6 is a perspective view illustrating the movements of the cam body.

As shown most clearly in FIGS. 2, 3 and 6, a spring hole 29 is provided on the back face of the cam portion 25 for mounting a coil spring 40 with one end of the coil spring 40 abutting against a bottom of the spring hole 29. The other end of the coil spring 40 abuts against the connecting seat 11 (FIG. 1) thereby forcing the came portion 25 toward the lead screw 18. A part 35 is formed on a side opposite to the cam portion 25 for supporting the left and right rotational movements of the cam portion 25.

Figure 7:
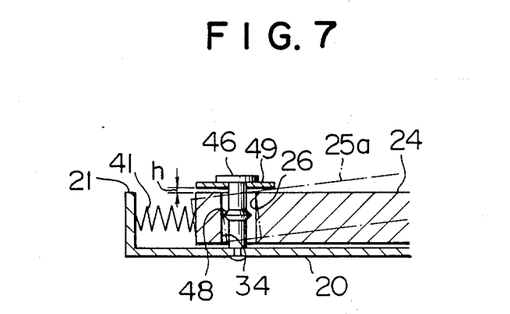
FIG. 7 is a partial cross-sectional view of the supporting pin.
Figure 11:
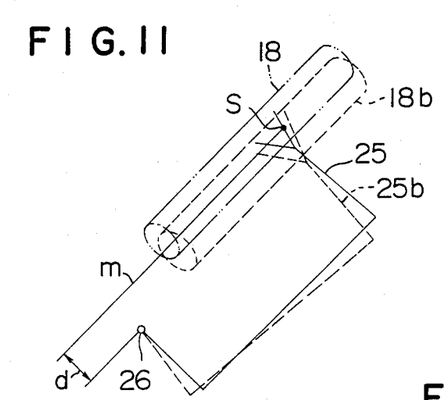

A square engaging bore 26 for the cam body 24 is formed with a surface thereof normal to a feeding direction of the lead screw 18. The location of the engaging bore 26 is selected so that a distance d between the tangential line m formed at the engaging point S of the lead screw 18 and the cam teeth 31, 32 and the center of the engaging bore 26 (FIG. 11) will be substantially equal to zero. Furthermore, the engaging bore 26 includes a supporting pin 46 mounted therein by a through hole 43 of a supporting spring 42. The pin 46 has two parallel portions 47 spaced from each other and an intermediate portion with a larger diameter. The lower end of the pin 46 is fixed to the cam base 20 by, for example, caulking the end portion of a stop hole 22. To prevent the supporting pin 46 from interfering with the swinging movement of the connecting cam body 24, the flange 49 of the supporting pin 46 is formed so as to provide a clearance h as shown most clearly in FIG. 7.

Figure 8:
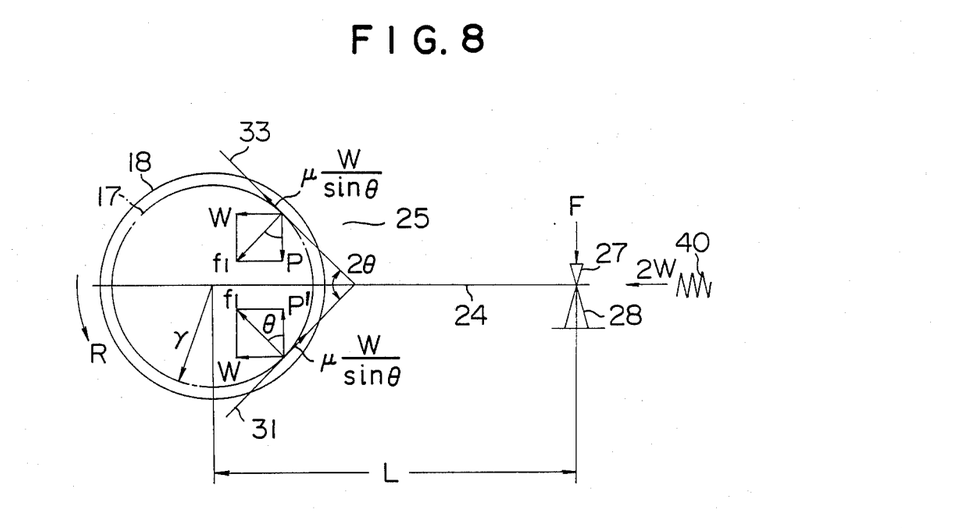
FIGS. 8 through 12 are schematic views respectively illustrating the movements of the cam body.

Further, at a location approximately on the middle portion of the connecting cam body 24 and remote from the line connecting the cam portion 25 with the supporting pin 46 is provided a portion 36 for supporting the rotational movement of the cam body in a vertical direction. The portion 36 is formed with supporting points 27, 28 each approximately of a convex configuration and located on both faces of the connecting cam body 24. The lower supporting point 28 abuts on the cam plate surface 20 and the upper supporting point 27 abuts on the edge portion 45 of the supporting spring 42 which comprises a spring member 44 (FIG. 2) retained by the supporting pin 46 (FIG. 6). Thus, there is provided a pivot mechanism in which a loading force F as shown in FIG. 8, is thereafter applied from the supporting spring 42 on the upper supporting point 27 which, in turn, cooperates with the lower supporting point 28 thereby enabling the mechanism to be both rotatable and slidable.

A L-shaped member is provided on the cam plate 20, with a spring member 41 being provided between the member 21 and the supporting part 35 for rotation movements of the connecting cam body 24. The spring 41 continuously forces the connecting cam body 24 against the cam plate 20 in the moving direction of the carriage 10 so that the engaging face 34 of the bore 26 of the cam body 24 can be continuously pressed against the supporting pin 46 at a larger diameter intermediate portion 48. Fastening means such as, for example, mounting screw holes 23, 23' are provided for the carriage 10 of the cam plate 20.

The moving mechanism of the connecting cam body 24 of the present structure will now be described with reference to FIGS. 6 through 11.

First the cam body 24 is so constructed that it can make a movement in the left and right direction (X direction) as well as a movement in the vertical direction (Y direction) as shown in FIG. 6. In other words, when a X directional movement takes place, this will provide a rotational movement around the first turning axis which is the supporting pin 46, and an additional sliding movement around the second turning axis which is the pivotal part 50 for supporting the vertical movement. On the other hand, when a Y directional movement takes place, the center of rotational movement will be at the pivotal part 50 for supporting the vertical movement, while a vertical movement by the connecting cam body 24 will take place along the supporting pin 46. First the stability of the lead screw 18 and the cam portion 25 will be discussed.

Referring to FIG. 8, if the load by which the spring 40 forces the cam portion 25 is assumed to be 2W, then, as is apparent from FIG. 8 the contact force $2f_1$ applied from the cam teeth 31, 33 onto the lead 17 will be expressed by $$2 \times \frac{W}{\sin\theta},$$

$2\theta$ being the included angle of the inclined edges and, for example, 120°. This means that the contact force can be multiplied by the factor of $1/\sin\theta$ when compared with the case in which only a parallel teeth part abuts against the lead. Thus, this multiplied contact force will realize a stabilized contact action between the lead screw 18 and the cam portion 25.

As also apparent from FIG. 8, the equilibrium condition for the connecting cam body 24 caused by the rotation of the lead screw 18 can be expressed by the following relationship:

$$2 \times \mu (W/\sin\theta) \times r = L \times F$$

wherein:
m=frictional coefficient,
L=the distance between the center of the lead screw 18 and the pivot, and
F=load acting on the pivot.

This means that a larger value of L will result in a smaller value of F thereby causing a desired X directional movement of the connecting cam body 24.

Description will now be made to the follow-up performance of the carriage 10 in a case where the lead screw 18 and the guide shafts 5, 6 are, for some reason incorrectly aligned due to, for example, manufacturing errors. In this case the moving directions of the lead screw 18 and the carriage 10 are not in parallel with each other or they have a certain height difference viewed in the plane of the paper shown in FIG. 9.

Figure 9:
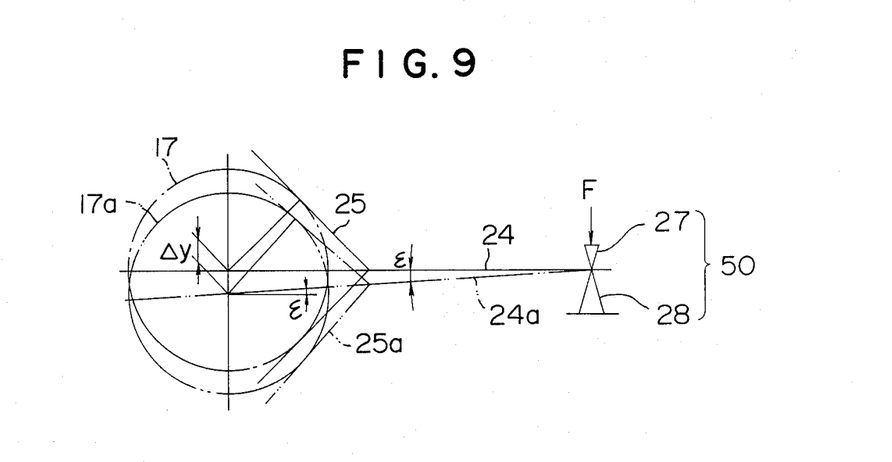
Figure 10:
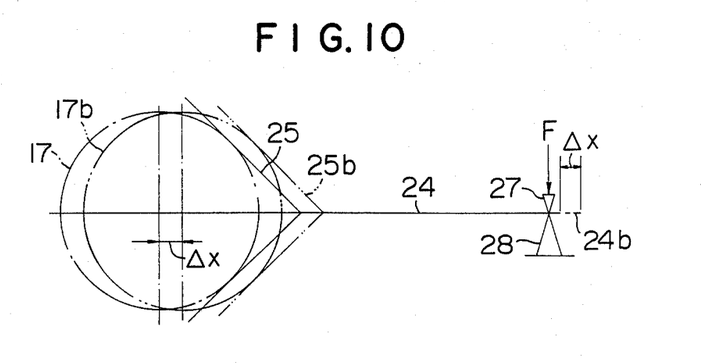

First an explanation will be made for the case of height difference. In FIG. 9 the value $\Delta y$ is defined as the height difference of the lead screw 18 caused within the feeding range of the carriage 10. The height difference $\Delta y$ will cause the cam portion 25 to move into an equilibrium position as shown by an alternate long and two short dashes line 25a in FIG. 9 thereby resulting in the rotation of the connecting cam portion 25 around the pivotal part 50 and into an inclined position 24a shown by a dotted chain line with its inclination degree of $\epsilon$. The displacement of the connecting cam body 24 in this condition will correspond to the advancement of the cam teeth 31, 33 along the lead 17 by an amount of the degree $\epsilon$. This advancement can be kept to a very small value if the distance L from the pivotal part 50 to the center of the lead screw 18 is set to a value large enough when compared with the value of $\Delta y$. For example, if L=11 mm, y=0.05 mm, $P_1$ (Lead pitch)=4.5 mm, and $\epsilon = \Delta y/L$ radian, then the displacement $\delta_1$ will be calculated by $$\delta_1 = \frac{P_1}{2\pi} \times \frac{\Delta y}{L} = \frac{4.5}{2\pi} \times \frac{0.05}{11} = 0.0033 \text{ mm} = 3.3 \ \mu\text{m}.$$

This means that the displacement $\delta_1$ can be suppressed to such a small value as about 6.6 percent of $\Delta y$.

Figure 12:
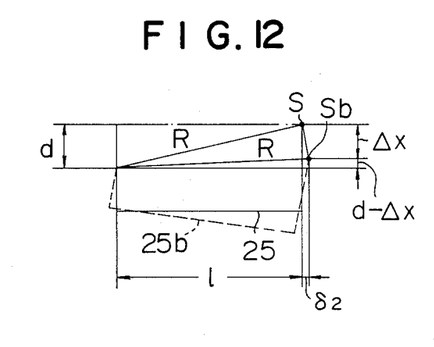

Then explanation will be made to the X directional displacement of the connecting cam body 24. In the same way as the foregoing, the value $\Delta X$ is defined as the deviation of the lead screw from its ideal position. This deviation will cause the connecting cam body 24 to move horizontally by the amount of $\Delta X$ into a position shown by a two dashes chain line 24b in FIG. 10. In this case the displacement $\delta_2$ of the cam body can be calculated as $\delta_2 = \sqrt{l^2 + 2d\Delta X - \Delta X^2} - l$ from FIG. 12 in which $R = \sqrt{l^2 + d^2}$ and $(l+\delta_2)^2 = R^2 - (d-\Delta X)^2 = l^2 + d^2 - d^2 + 2d\Delta X - \Delta X^2 = l^2 + 2d\Delta X - \Delta X^2$. If d is infinitely small (d→o), then $\delta_2 = \sqrt{l^2 - \Delta X^2} - l$. Substituting l=25 mm and $\Delta X$=0.05 mm for the above expression, then we have $\delta_2 = \sqrt{25^2 - 0.05^2} - 25 = -0.00005$ mm $= -0.05 \ \mu$m. This value is a negligibly small one.

In connection with the above-mentioned Y directional displacement it should be noted that any locational change of the connecting cam body 24 will not take place even when the cam body 24 turns around the pivotal part 50. This is because the engaging bore 26 for the supporting pin 46 has a square configuration with its plane surface 34 normal to the feeding direction of the lead screw 18 whereby only the larger diameter intermediate portion 48 will move along the plane surface 34 of the square engaging bore 26 during the rotational movement of the connecting cam body 24.

According to the embodiment of the invention the following advantageous effects will be obtained:

Any tendency for causing the backlash between the cam teeth and the lead 17 will be prevented since the lead 17 is engaged with the cam teeth 31, 33 having a V shape beveling resulting in increased contact stability between the cam teeth 31, 33 and the lead 17.

Even when the rotational direction of the lead screw 18 is changed, the force acting on the connecting cam body 24, or the vertical force acting on the carriage 10 will only change its sign of acting direction upon the possible change of the rotational moment.

Thus, the above-mentioned vertical force can be always maintained at such a low value that another force pressing the carriage 10 against the guide shafts (this force being 2W exerted by the coil spring 40, according to the present embodiment) will be changed only slightly in terms of its direction and magnitude. This finally means that the carriage 10 can be always pressed against the guide shafts 5, 6 in one particular direction thereby causing no swinging movement of the carriage 10.

High precision feeding and indexing of the connecting cam body 24 can be realized because the connecting cam body 24 follows three-dimensionally after the displacement of the lead screw 18. This feature is obtained because there are two independent centers of rotation for the connecting cam body 24, namely, the X directional center located on the contacting line between the cam teeth 31, 33 and the lead 17, and having a clearance between the center bore and the supporting pin 46, and the other the Y directional center located on a point remote from said contact line and having a pivotal support which is also slidable.

The connecting cam body 24 has a good following performance since the Y directional center is located at a point remote from the above-mentioned contact line thereby enabling the pivot force to be small.

Since the engaging bore for the X directional rotation center is formed of a square engaging bore 26 with its face normal to the feeding direction, any locational change of the connecting cam body 24 can be prevented during its vertical movement in the engaging bore 26.

No change of the contact position due to inclination of the connecting cam body 24 against the cam base takes place, since the supporting pin 46 has a large diameter intermediate portion 48.

Since the cam portion 25 is forced by a coil spring from the directions of rotational tangents for the cam teeth 31, 33, teeth 31, 33 and the carriage 10 are applied with a stable side force for maintaining a good following performance of the cam portion 25. Similarly, the connecting cam body 24 will not be subjected to a loss of its following performance, since the connecting cam body 24 and its supporting pin 46 are applied with a spring force from the same direction as that of the movement of the carriage 10.

As mentioned above, since the improved following performance for the lead screw 18 is obtained, the allowance for the dimensional errors of the lead screw 18 concerning the direction of the carriage movement can be larger.

As set forth, according to the present invention, a mechanism for moving magnetic head 9 is obtained, which can realize precise positioning of the magnetic head 9 because the follow-up performance of the mechanism for the relative displacement between the lead screw 18 and the carriage 10 can be improved due to the stabilized contact between the lead screw 18 and the cam teeth 31, 33.

We claim:

1. A mechanism for displacing a magnetic head, the mechanism comprising:
    a chassis;
    a motor attached to the chassis;
    a lead screw mounted to be rotated by the motor around an axis thereof in a first and second direction;
    a guide shaft means attached to the chassis in parallel with the lead screw;
    a carriage carrying a magnetic head thereon and being supported by the guide shaft means so as to be translationally displaceable in a first or second direction along which the guide shaft means extends;
    a connecting cam body between the carriage and lead screw for converting the rotational displacement of the lead screw around the axis thereof into a translational displacement of the carriage, the connecting cam body being attached at one end thereof to a plate fixed to the carriage rotatable in a first direction around an axis located at a position between the lead screw and the guide shaft means substantially perpendicular to a plane including the lead screw and guide shaft means, and having at another end thereof, cam tooth means engaged with the lead screw to define a line of engaging contacts therebetween;
    an elastic means disposed between the connecting cam body and the carriage for pressing the cam tooth means of the connecting cam body against the lead screw to press the carriage against the guide shaft means;
    a pair of protruding portions, with one of the pair of protruding portions formed on a face of the connecting cam body adjacent said plate and the other of the pair of protruding portions on a face of the connecting cam body opposite to the face adjacent said plate; and
    means for enabling pivoting of the connecting cam body in a second direction around the pair of protruded portions formed on opposite faces thereof at a position remote from the line of engaging contacts between the cam tooth means and the lead screw.

2. A mechanism according to claim 1, wherein the axis about which the connecting cam body is rotated in a first direction is situated on or adjacent to the line of engaging contact between the cam tooth means and the lead screw.

3. A mechanism according to claim 2, wherein the connecting cam body includes a bore for rotatably accommodating the rotatable shaft, and wherein a pressing means is provided for pressing a wall defining the bore against the rotatable shaft.

4. A mechanism according to claim 2, wherein a supporting spring means for pressing the connecting cam body against the plate is attached to the rotatable shaft.

5. A mechanism according to claim 3, wherein the bore has a substantially square configuration and includes a wall extending perpendicular to a direction along which the carriage is displaced.

6. A mechanism according to claim 3, wherein the rotatable shaft comprises a supporting pin having an intermediate portion with a diameter larger than a diameter of upper and lower portions thereof.

7. A mechanism according to claim 4, wherein one of a pair of protruded portions abuts against the plate, the other of the pair of protruded portions abuts against the supporting spring means, and the supporting spring means and the connecting cam body have a gap therebetween for allowing a part of the connecting cam body around the bore to be displaced in a direction along which the plate and the connecting cam body are arranged.

* * * * *